United States Patent [19]
Cook et al.

[11] Patent Number: 5,817,951
[45] Date of Patent: *Oct. 6, 1998

[54] MULTI-AXIS WHEEL TRANSDUCER WITH ANGULAR POSITION DETECTOR

[75] Inventors: Nathan H. Cook, North Eastham; Forest J. Carignan, Bedford; Bruce F. White, Natick, all of Mass.

[73] Assignee: Advanced Mechanical Techology, Inc., Watertown, Mass.

[ * ] Notice: The term of this patent shall not extend beyond the expiration date of Pat. No. 5,540,108.

[21] Appl. No.: 681,729

[22] Filed: Jul. 29, 1996

Related U.S. Application Data

[60] Division of Ser. No. 291,256, Aug. 16, 1994, Pat. No. 5,540,108, which is a continuation-in-part of Ser. No. 201,631, Feb. 25, 1994, abandoned.

[51] Int. Cl.$^6$ ........................................................ G01L 5/16
[52] U.S. Cl. ................................ 73/862.041; 340/870.28
[58] Field of Search ....................... 73/862.041, 862.042, 73/862.043, 862.045, 862.621, 862.627, 862.631; 33/1 N, 1 PT

[56] References Cited

U.S. PATENT DOCUMENTS

| | | | |
|---|---|---|---|
| 3,273,382 | 9/1966 | Fonash ..................................... | 73/88.5 |
| 3,306,159 | 2/1967 | Beall, Jr. et al. ........................ | 250/225 |
| 3,474,255 | 10/1969 | White ..................................... | 250/225 |
| 3,939,704 | 2/1976 | Zipin ..................................... | 73/133 R |
| 4,023,404 | 5/1977 | Brendel .............................. | 73/862.042 |
| 4,109,998 | 8/1978 | Iverson ...................................... | 350/23 |
| 4,493,220 | 1/1985 | Carignan et al. .................... | 73/862.66 |
| 4,605,925 | 8/1986 | Mark .................................. | 340/870.29 |
| 4,672,855 | 6/1987 | Schmeider ........................... | 73/862.04 |
| 4,753,110 | 6/1988 | Burchett et al. .................... | 73/862.043 |
| 4,958,904 | 9/1990 | Rawski .................................... | 350/96.2 |
| 4,964,299 | 10/1990 | Maier et al. .............................. | 73/146 |
| 5,004,915 | 4/1991 | Umehara et al. .................. | 250/231.14 |
| 5,313,828 | 5/1994 | Kötzle et al. ............................. | 73/146 |
| 5,540,108 | 7/1996 | Cook et al. ........................ | 73/862.041 |

FOREIGN PATENT DOCUMENTS

| | | | |
|---|---|---|---|
| 0133581 | 2/1985 | European Pat. Off. ......... | G01D 5/34 |
| 0 352 788 A3 | 7/1989 | European Pat. Off. .......... | G01L 5/16 |
| 43 11903 A1 | 10/1994 | Germany ......................... | G01L 5/00 |
| 4311903A1 | 10/1994 | Germany ......................... | G01L 5/00 |
| 60-159611 | 8/1985 | Japan ............................... | G01D 5/36 |
| 2190201 | 11/1987 | United Kingdom .......... | G01M 17/02 |

OTHER PUBLICATIONS

Rupp, A., et al., "Development of a Multi–Component Wheel Force Transducer —A Tool to Support Vehicle Design and Validation, "*SAE Technical Paper Series, International Congress and Exposition*, pp. 1–11 (1993, March).

Shoberg, R. S., et al., "A Triaxial Automotive Wheel Force and Moment Transducer,"*Society of Automotive Engineers, Autotive Engineering Congress and Exposition*, pp. 1–24 (1975, Feb.)

(List continued on next page.)

*Primary Examiner*—Ronald L. Biegel
*Attorney, Agent, or Firm*—Hamilton, Brook, Smith & Reynolds, P.C.

[57] ABSTRACT

An apparatus and method for a multi-axis wheel transducer are disclosed. The apparatus of the invention comprises a wheel transducer for measuring the loads and moments acting on a vehicle wheel. Tubular load cells positioned in a radial fashion around the perimeter of the transducer hub join the rim and hub. Loads and moments acting on the rim of the wheel are transferred through the spoke-like load cells to the hub of the wheel. Sensors strategically positioned around the circumference of the tubular load cell monitor the intensity of the loads and moments. To detect angular position of the wheel, a light source generates a cone of polarized light to flood the wheel of the vehicle and detector-polarizing filter pairs detect an angle of the polarization relative to the wheel to determine its angular position. The transducer hub computer processes the sensor data and transfers the information via infrared signal to a computer located in the fender of the vehicle.

51 Claims, 13 Drawing Sheets

OTHER PUBLICATIONS

"Model 6613 Triaxial Automotive Wheel Force/Moment Transducer,"*GSE, Inc., Bulletin* 158, pp. 1–2 (1992).

S. Himmelstein and Company, "Low Range, High Overload Non–Contact Wheel Torquemeter,"*Bulletin* 780–1, pp. 1–4 (1990).

Loh, V.R., et al., "Mehrkomponenten–RadmeBnabe Einsatzmöglichkeiten und Ergebnisse,"*ATZ Automobiltechnische Zeitschrisft* vol. 94(1) :44–46 49–53 Stuttgart, De, XP241631 (Jan., 1992). (partial translation attached thereto).

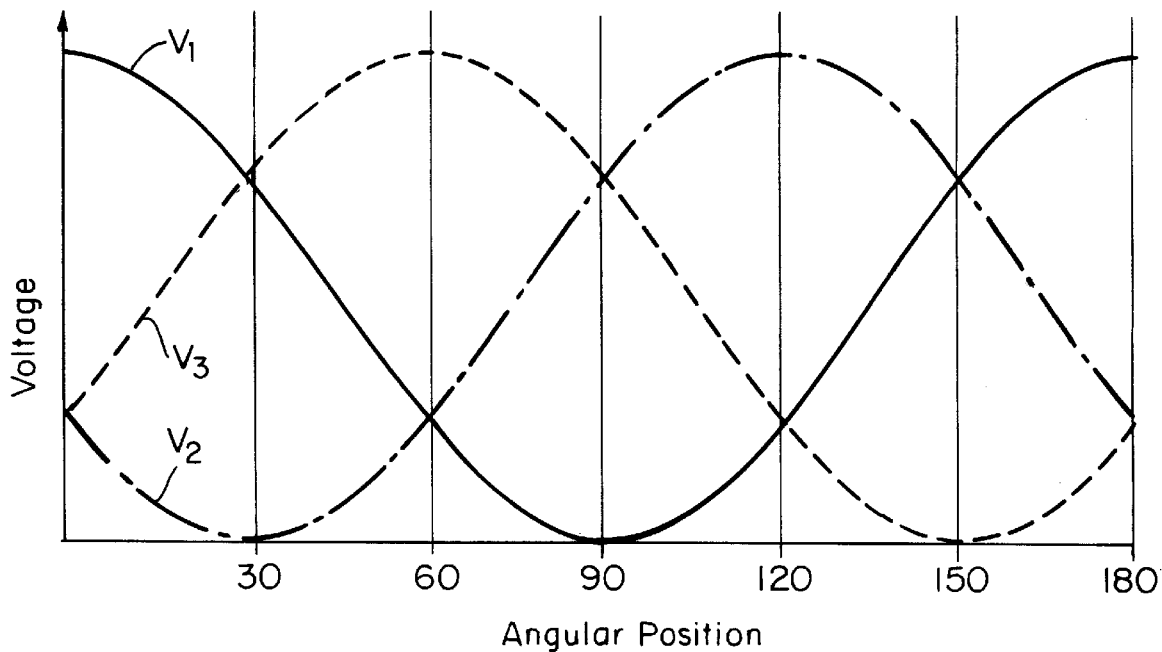
Fig. 15
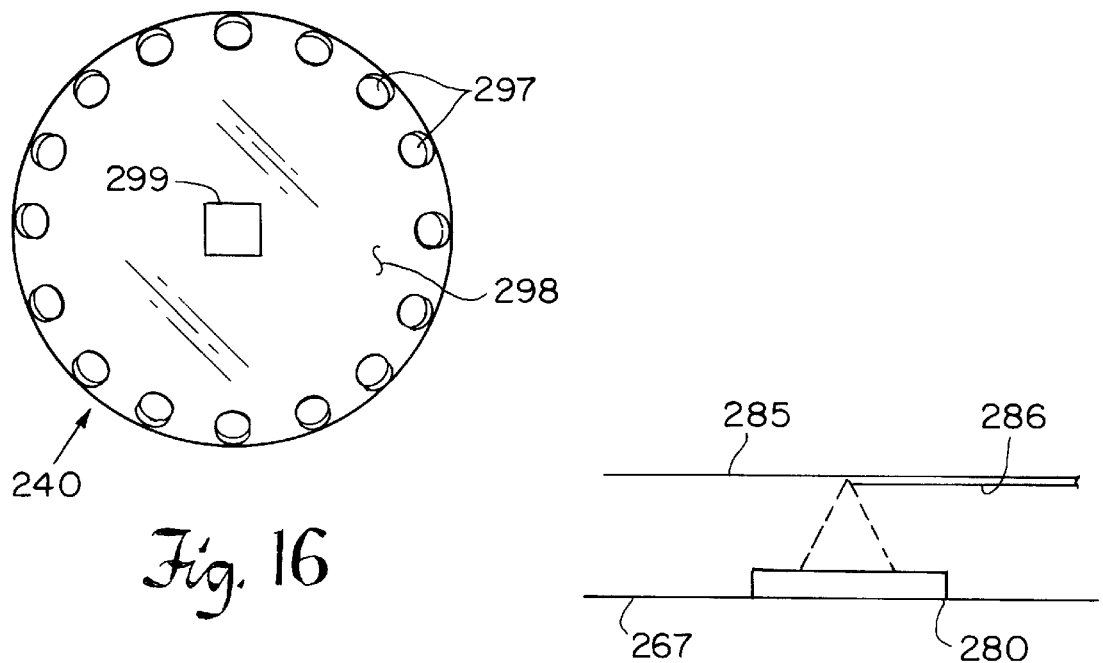
Fig. 16
Fig. 17

MULTI-AXIS WHEEL TRANSDUCER WITH ANGULAR POSITION DETECTOR

This application is a division of application Ser. No. 08/291,256 filed Aug. 16, 1994 now U.S. Pat. No. 5,540,108, which is a Continuation-in-Part of U.S. Ser. No. 08/201,631, filed Feb. 25, 1994, now abandoned.

BACKGROUND OF THE INVENTION

The design and validation of automobile components requires a detailed knowledge of the loads acting on the wheel. The loads include normal, lateral, and longitudinal forces and drive, steering, and overturning moments. An accurate accounting of the loads enables vehicle designers to produce more durable, more efficient, more reliable, and safer vehicle components. To that end, wheel transducers are mounted on automobile and truck wheels for measuring loads introduced to the wheels.

SUMMARY OF THE INVENTION

The present invention is directed to an apparatus and method for sensing loads such as forces and moments exerted on a wheel. A novel sensor structure and novel communication link to the rotating sensor are provided.

The apparatus of the invention comprises a hub mounted to a drive axle, a rim, and a plurality of tubular-shaped load cells which join the hub to the rim. A plurality of interconnected strain gages are mounted on each load cell to provide an indication of the forces and moments acting on the interface of the hub and wheel. The tubular load cells are preferably mounted radially as spokes between the wheel and the hub, and may be pre-loaded with a mean compression. The compressive force is preferably provided by introducing an interferential fit between the load cells and the rim. The load cells are preferably mounted within cavities, such that upon failure of a load cell, the rim and hub remain coupled, with the failed load cell resisting relative axial movement of the hub and rim.

The forces and moments sensed by the load cells are preferably transmitted optically and radially outward from the wheel transducer to an optical receiver mounted on the fender of the automobile. Communication may also be performed in a reverse direction, from a transmitter located on the fender to a receiver located in the wheel transducer.

In general according to another aspect, the invention features an angular position detecting device for a wheel of a vehicle. This device comprises a light source generating a beam of light and a light detector for detecting the beam of light from the light source. A first polarizer is optically interposed between the light detector and the light source and has a frame of reference corresponding to the vehicle. A second polarizer is then optically interposed between the light detector and the light source and has a frame of reference corresponding to the wheel. The light intensity received by the detector then correlates to the rotational position of the wheel.

In specific embodiments, a processor generates an indication of an angular position of the wheel in response to an intensity of light received by the light detector. In other embodiments, the light source is substantially rigidly connected to a frame of the vehicle while the light detector is positioned on the wheel of the vehicle.

In general according to still another aspect, the invention features a steering angle and/or vertical position detecting device for a wheel of a vehicle. This device comprises a light source rigidly connected to a frame of the vehicle, a light detector positioned on the wheel for detecting the light generated by the light source. A light obstruction is positioned over the light detector and spaced apart from the light detector. From this configuration a processor determines a steering angle and/the vertical position of the wheel in response to the intensity of light detected by the light detector.

In specific embodiments, an angular position detector detects a rotational angle of the wheel which is used by the processor to determine a steering angle of the wheel.

BRIEF DESCRIPTION OF THE DRAWINGS

The foregoing and other objects, features and advantages of the invention will be apparent from the following description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 15 illustrates the time varying responses of voltages $V_1$, $V_2$, and $V_3$ which are obtained from angular position sensors.

FIG. 16 shows the organization of light emitting diodes in the fender unit.

FIG. 17 shows the changing shadow cast by the blackened portion of the cover on the angle of inclination sensors.

DETAILED DESCRIPTION OF PREFERRED EMBODIMENTS

Figure 1:
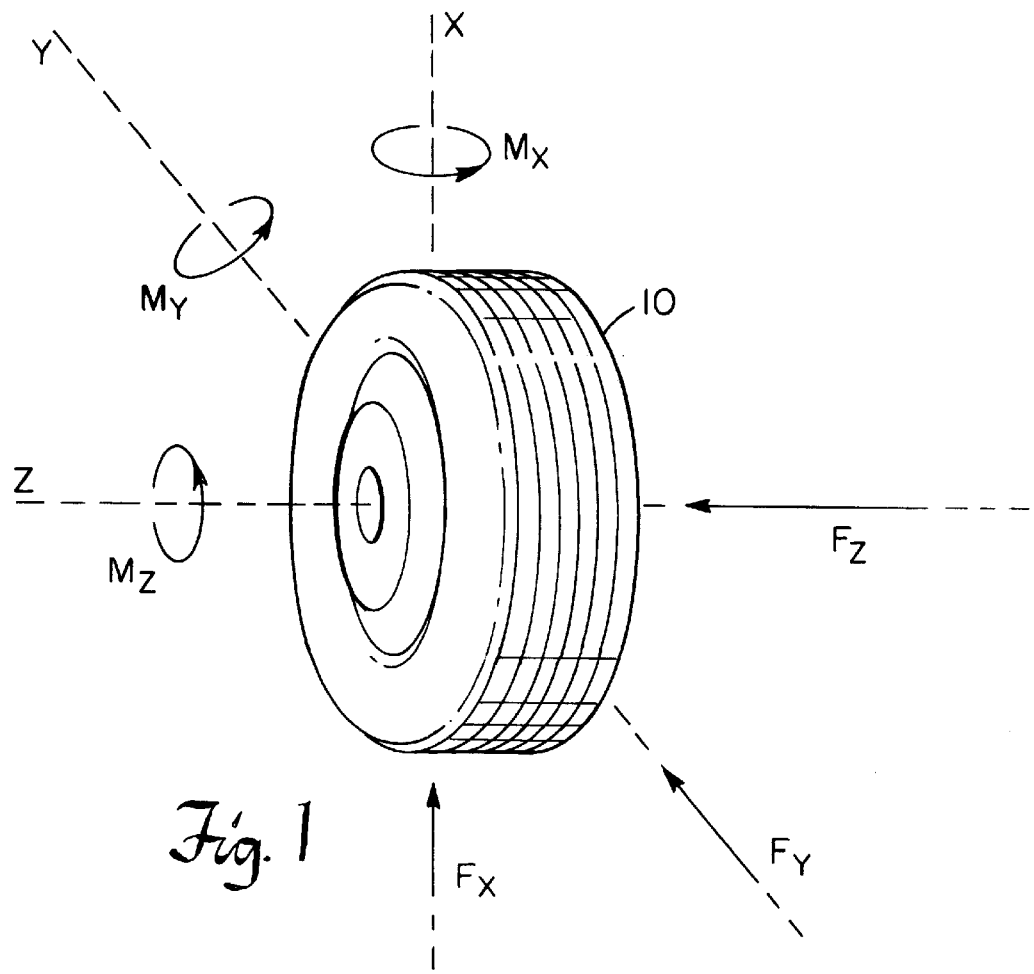
FIG. 1 is a perspective view of a wheel, illustrating the various moments and forces acting on the wheel.

FIG. 1 illustrates generally a diagram of the forces and moments that act on an automobile wheel 10. The origin of the coordinate system is positioned at the wheel center. The X, Y, and Z axes extend outward from the origin as shown. The X and Y axes are defined as being in the frame of reference of the rotating wheel. The forces measured by the inventive wheel transducer include the vertical $F_X$, the lateral $F_Z$, and the longitudinal $F_Y$ forces. The moments measured by the device include drive torque $M_Z$, steering moment $M_X$, and overturning moment $M_Y$.

Figure 2:
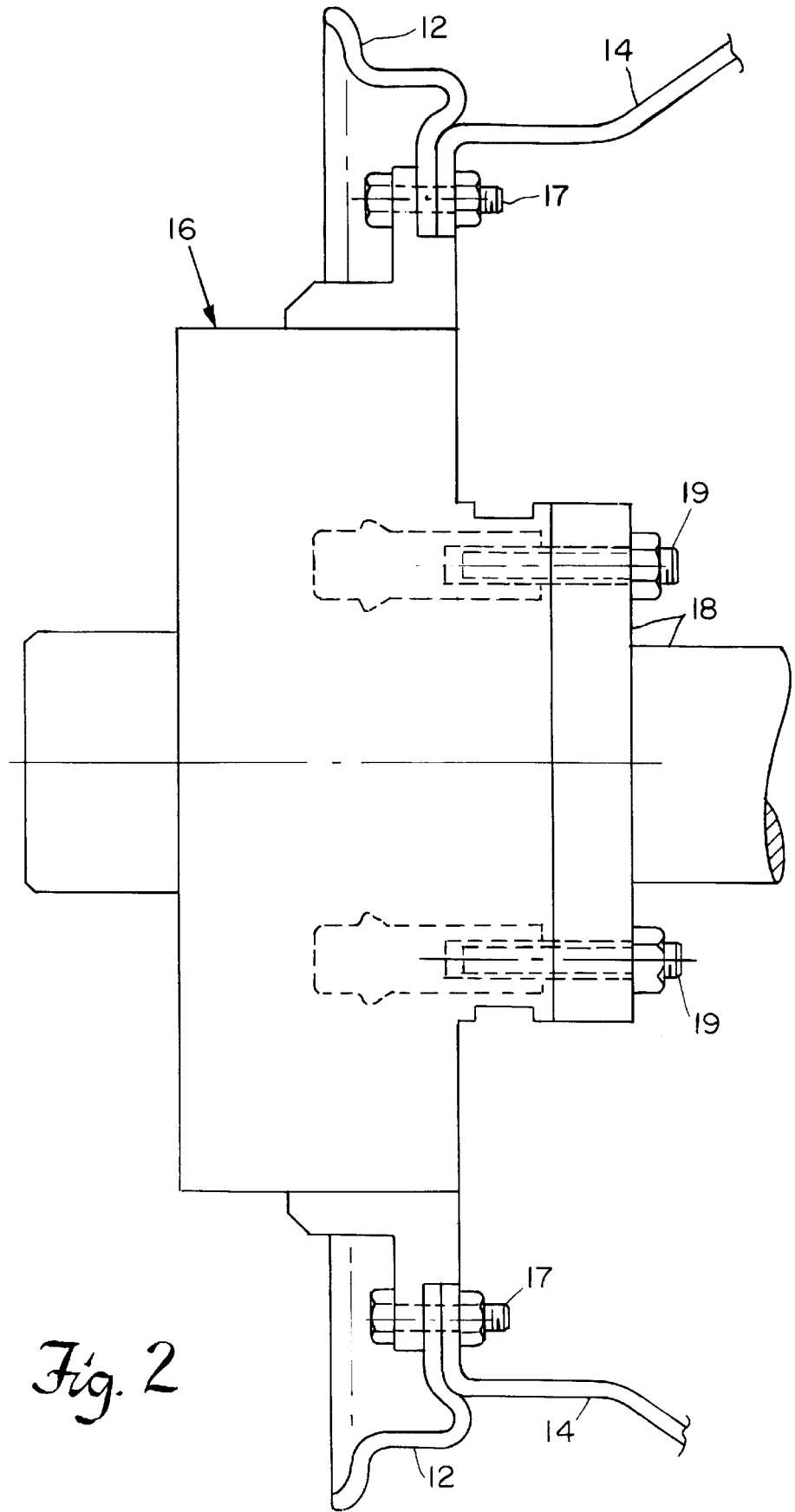
FIG. 2 is a sectional side view of a wheel transducer hub mounted to a wheel rim, in accordance with the present invention.

FIG. 2 is a sectional side view of a wheel transducer apparatus constructed according to the principles of the present invention. The standard three-piece wheel has first 12 and second 14 rim aluminum members for supporting a tire. A transducer 16 replaces a standard hub and is mechanically coupled to the first 12 and second 14 rim members by a plurality of rim bolts 17. The transducer 16 is mechanically coupled to the vehicle axle 18 with a plurality of axle bolts 19.

Figure 3:
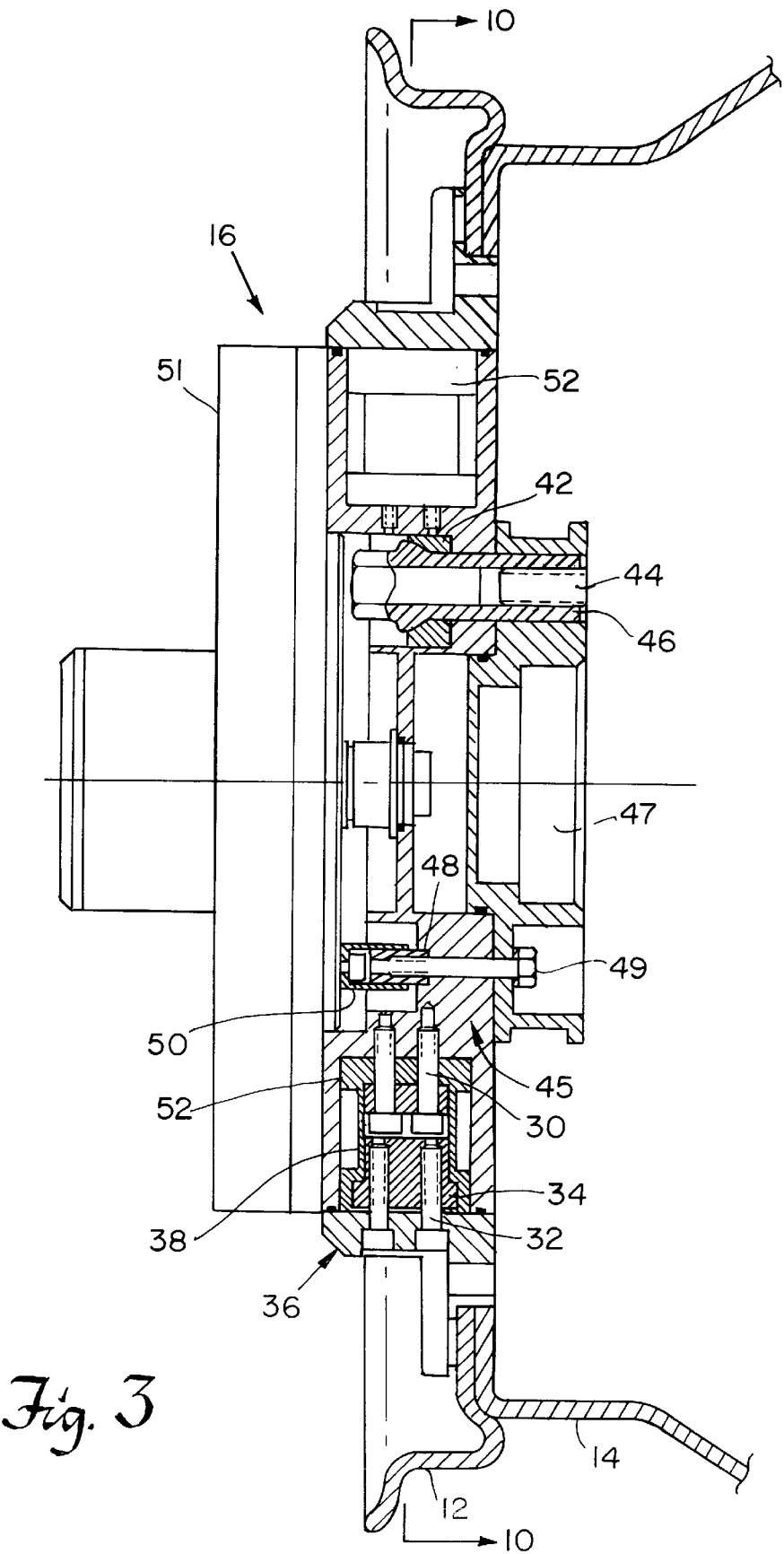
FIG. 3 is a sectional side view of a wheel transducer, illustrating the mechanical coupling of the hub to the axle, and the mechanical coupling of the rim to the hub at the load cell, in accordance the present invention.

FIG. 3 is a sectional side view of a wheel transducer apparatus in accordance with the present invention. As will be discussed in further detail, the transducer 16 comprises a rim 36, fixed to the standard rim members 12 and 14, the rim 36 surrounding a hub 45. The rim 36 is joined to the hub 45 by a plurality of radial spoke-like load cells 52.

Figure 10:
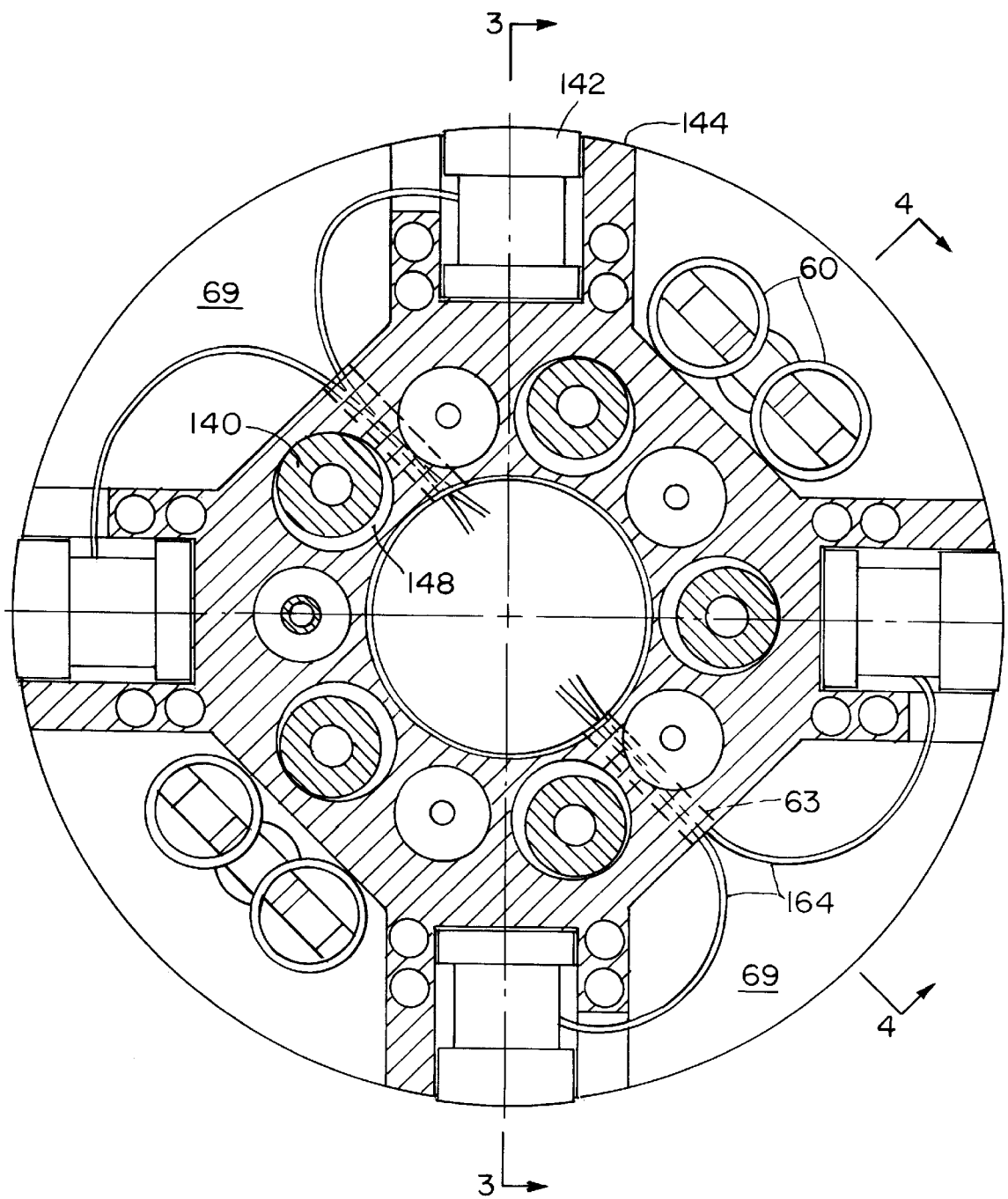
FIG. 10 is a sectional view of the transducer hub, showing four radially positioned load cells, batteries, and axle mounting hardware.

Before mounting of the transducer 16, an axle hub adapter 47 is mounted to the transducer hub 45 by bolts 49 and line-up pin 48. The housing 47 is sized to adapt to the particular axle to which the wheel is to be mounted. An electronics module 51 is removed to expose bolt holes in the hub 45 and the housing 47. The wheel is positioned on the axle with the axle bolts 44 through the bolt holes. A plurality of extended lug nuts 46 mechanically couple the transducer hub 45 to the existing axle bolts 44 on the axle of the vehicle. The eccentric sleeve 42 guides the lug nut 46, and may be positioned to allow for a range of axle bolt circle diameters. FIG. 10 is a sectional front view of the wheel transducer, offering another perspective of the eccentric sleeve 148 which allows for variable lug nut 140 positioning. The eccentric sleeve 148 is rotated and press fit into hub 45 to accommodate a variety of axle bolt circle diameter placements.

After mounting of the transducer rim 36 and hub 45 to an axle, the electronics module 51 is mounted to the hub 45. A line-up pin 48 on a bolt 49 receives the sleeve 50 to properly align the electronics module to the hub.

Each load cell 52, has a cylindrically shaped body 38 which is tubular. The body 38 is positioned within a cavity in the transducer hub 45 and is mounted to the transducer hub 45 by four bolts 30 threaded into the hub 45. A plug 34 is threaded into the cylinder body 38. The plug 34 is mounted to the outer rim element 36 with four bolts 32 threaded into the plug 34.

The load cells 52 can be preloaded with a residual compressive stress at the time the rim 36 is mounted to the transducer hub 45. As shown in FIG. 10, the load cells 142 extend beyond the wheel transducer hub 144 such that when the rim is mounted on the transducer hub 144, the load cells 142 are pre-loaded with compression, reducing or delaying the likelihood of fatigue failure due to alternating stresses, tensile stresses and road bumps. Assembly and disassembly is accomplished by thermal expansion of the rim 36 before mating the rim with the transducer hub 45. An interference fit of approximately a few thousandths of an inch between each load cell 52 and the outer rim element 36 provides sufficient preloading.

Because the weight of the vehicle is supported by the transducer hub, fail-safe design is an imperative. While prior art wheel transducers require add-on safety elements, the present invention is inherently fail-safe. In the present invention, the load cell elements are the most highly stressed components and therefore, most susceptible to failure due to overload or fatigue. If one or more of the load cells fail, the rim section remains completely constrained relative to the hub section. The wheel may rattle, but will not come apart. Radial constraint is due to the close fit of the rim 36 about the hub 45, and axial constraint is provided by the plug fixed to the rim 36 and captured within the load cell cavity in the hub 45.

Figure 5:
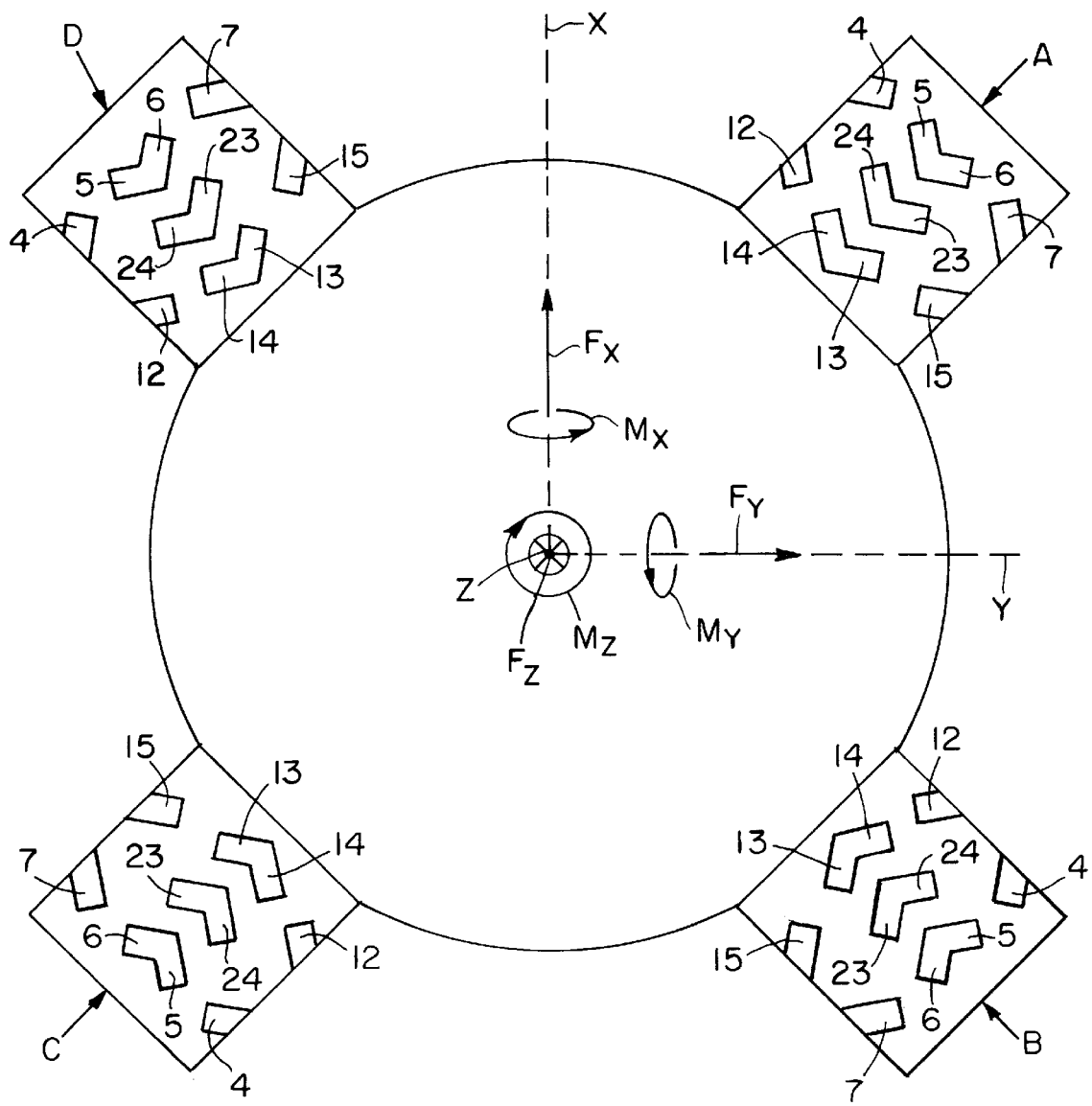
FIG. 5 is an illustration of the forces and moments detected by the sensors mounted on four identical radially-mounted load cells.

FIG. 5 is a front-view illustration of a wheel transducer having four load cells, A, B, C, and D. Each load cell has an identical pattern of strain gages which are placed in an optimal fashion for measuring the forces $F_X$, $F_Y$, and $F_Z$, and moments $M_X$, $M_Y$, and $M_Z$, acting on the wheel. The sensitivity of a shear strain element is inversely proportional to the cross-sectional area of the body under stress. Thus, the cross-sectional area of each load cell in a plane perpendicular to the maximum load should be held to a minimum. To obtain a stiff load cell which provides a high natural frequency, a thin rod is not feasible. To provide a small cross-sectional area along with stiffness and strength, tubular load cells are ideal.

Figure 6A:
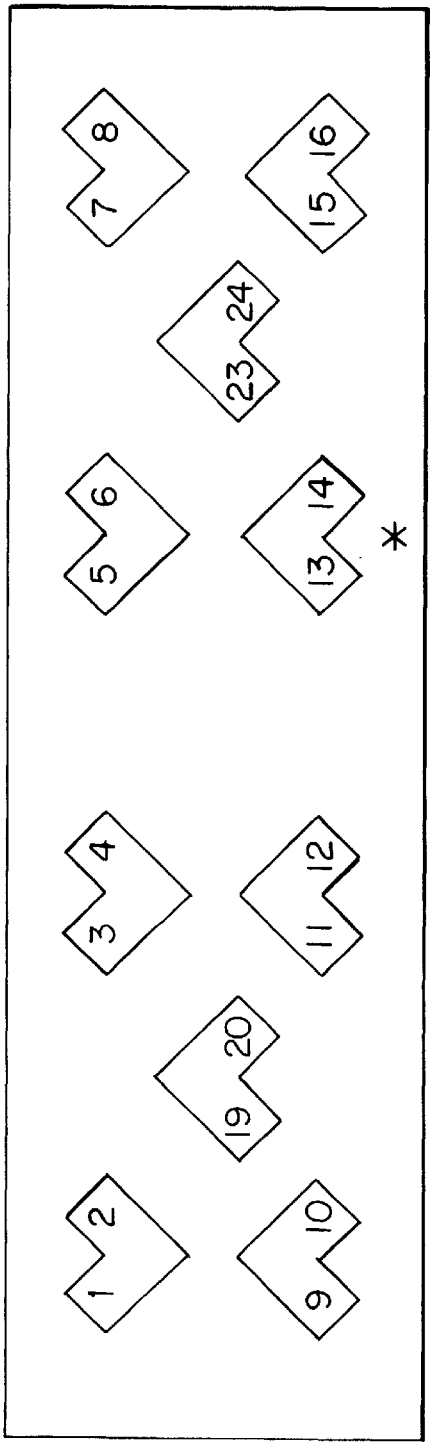
FIG. 6A illustrates an arrangement of sensors, along the cylindrical surface of each load cell.

An arrangement of strain gages on each of the four load cells is illustrated by FIG. 6A. The strain gages are shown on an unwrapped cylindrical load cell as if mounted on tape of a length which matches the circumference of the load cell, which tape can be placed around the cell. The asterisk shown in the layout of FIG. 6A would be positioned towards the bottom of each cell pointing towards the wheel center.

Figure 7:
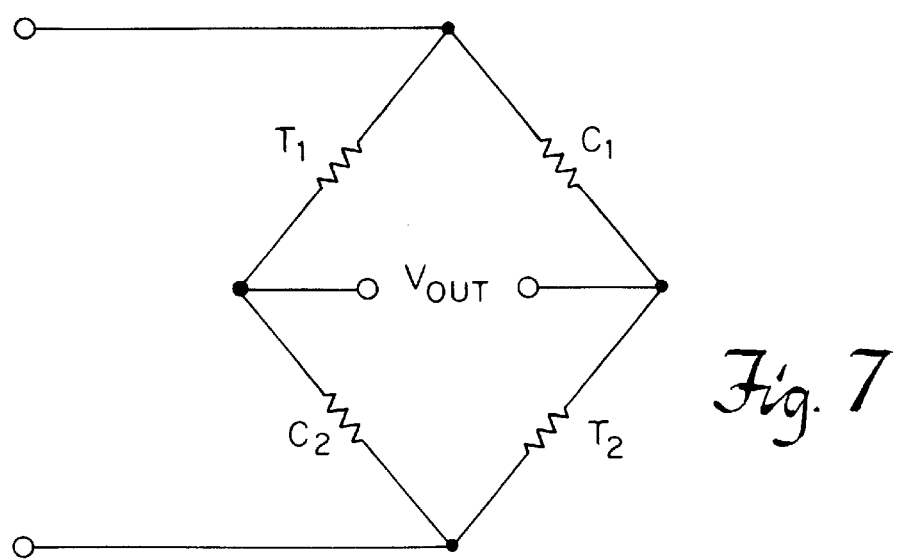
FIG. 7 is an electrical schematic of a Wheatstone Bridge in which strain gages are connected.

The strain gages on each load cell are connected electrically in Wheatstone Bridges. A bridge is illustrated in FIG. 7, and a different bridge measures each of the forces $F_X$, $F_Y$, and $F_Z$ and the moments $M_X$, $M_Y$ and $F_Z$, of FIG. 5. A suitable connection of the gages as elements T1, T2, C1, and C2 of the bridges are illustrated by the following table.

TABLE

Gages $T_1$, $T_2$, $C_1$ and $C_2$ In Wheatstone Bridge
To Measure Forces F and Moments M

|   | $T_1$ | $T_2$ | $C_1$ | $C_2$ |
|---|---|---|---|---|
| $F_x$ | $A_{14} + A_9 +$ $B_{14} + B_9$ | $C_{10} + C_{13} +$ $D_{10} + D_{13}$ | $A_{13} + A_{10} +$ $B_{13} + B_{10}$ | $C_9 + C_{14} +$ $D_9 + D_{14}$ |
| $F_y$ | $A_1 + A_6 +$ $B_2 + B_5$ | $D_1 + D_6 +$ $C_2 + C_5$ | $A_2 + A_5 +$ $B_1 + B_6$ | $C_1 + C_6 +$ $D_2 + D_5$ |
| $F_z$ | $A_{12} + A_{15} +$ $B_{12} + B_{15}$ | $C_{12} + C_{15} +$ $D_{12} + D_{15}$ | $A_{11} + A_{16} +$ $B_{11} + B_{16}$ | $C_{11} + C_{16} +$ $D_{11} + D_{16}$ |
| $M_x$ | $A_3 + B_8$ | $C_4 + D_7$ | $A_4 + B_7$ | $C_3 + D_8$ |
| $M_y$ | $B_3 + C_8$ | $A_7 + D_4$ | $B_4 + C_7$ | $D_3 + A_8$ |
| $M_z$ | $A_{20} + A_{23} +$ $B_{20} + B_{23}$ | $C_{20} + C_{23} +$ $D_{20} + D_{23}$ | $A_{24} + A_{19} +$ $B_{24} + B_{19}$ | $C_{24} + C_{19} +$ $D_{24} + D_{19}$ |

For the Table, columns T1, T2, C1, and C2 represent the four legs of the Wheatstone Bridge. For each leg, strain elements (1–24) from the 4 load cells (A, B, C, and D) are wired together in series to produce a resistance sum.

Figure 6B:
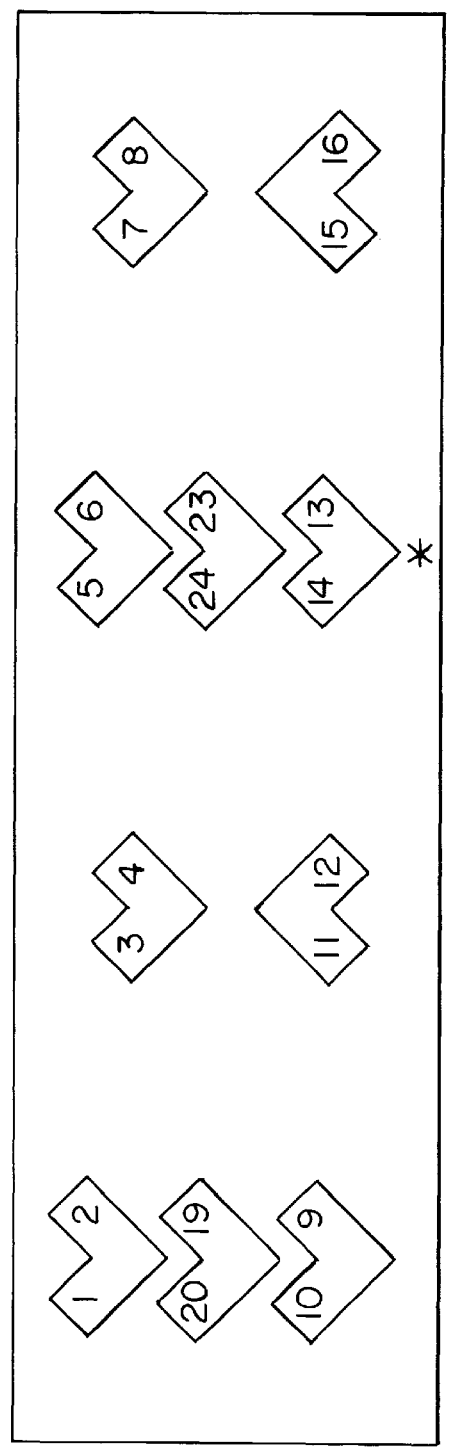
FIG. 6B is an illustration of a preferred arrangement of sensors along the cylindrical surface of each load cell.

A preferred arrangement of gages is shown in FIG. 6B. In this arrangement, the gages are all located at the point of maximum sensitivity. From the above table, it may be determined that for load cell A, gages 9 and 14 are in tension for positive X-axis loading and gages 10 and 13 are in compression for positive X-axis loading. Gages 1 and 6 are in tension for positive Y-axis loading and gages 2 and 5 are in compression for positive Y-axis loading. Gages 12 and 15 are in tension for positive Z-axis loading and gages 11 and 16 are in compression for positive Z-axis loading. Gages 3 and 4 are in tension and compression for the positive steering moment $M_X$, gages 7 and 8 are in tension and compression for the positive overturning moment $M_Y$ and gages 20, 23, 24, and 19 are in tension and compression for the positive drive torque $M_Z$.

Figure 4:
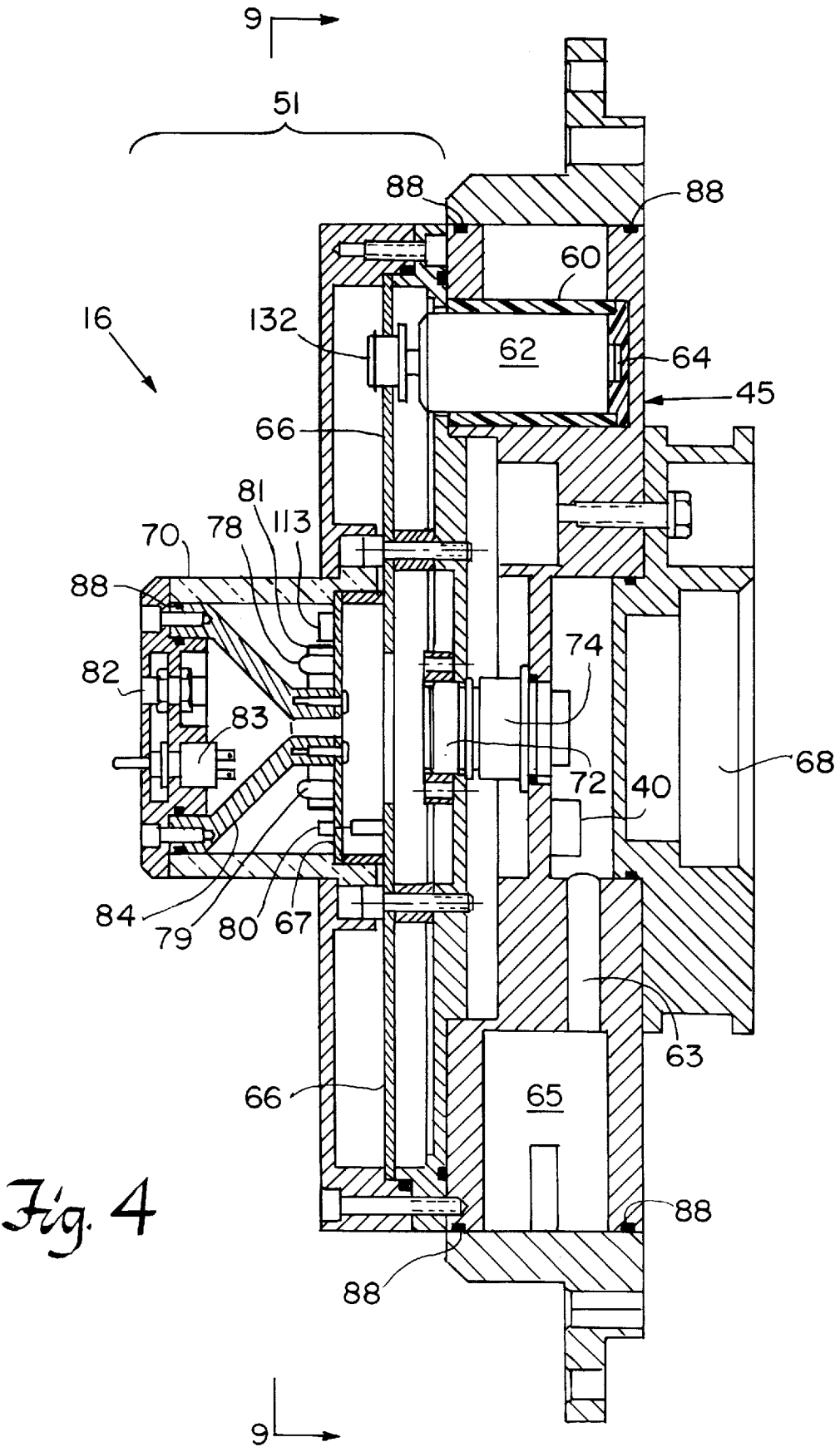
FIG. 4 is a sectional side view of a wheel transducer, illustrating a first embodiment of an electronics module, the battery, the communication module, and the mirror, in accordance the present invention.

FIG. 4 is another sectional view of the wheel transducer, including a cross-section of a first embodiment electronics module 51. As shown in FIGS. 4 and 10, wires 64 from each load cell chamber 65 run through peripheral cavities 69 in the hub 45 and through channels 63 to a male connector 74, which mates with a female connector 72 on the electronics board 66. Wires from a temperature sensor 40 also pass through the mating connectors 74 and 72 to the electronics module 51. A plurality of batteries 62 mounted in the transducer hub 45 provide a power source for the electronics module 51. The battery terminals 64 are spring preloaded to minimize the effects of vibration. The battery is mounted in a delrin sleeve 60 for similar reasons.

The first embodiment electronics module 51 is comprised of sensor amplifiers, an analog-to-digital converter, a microprocessor, and memory on a board 66, and a communication system on a daughter board 67. The electronics module 66 is mated to the communication daughter board 67 by connectors 80.

The communications daughter board 67 is comprised of infrared light receivers 113, infrared light transmitters 78, red LEDs 79, and a light baffle 81 for blocking the infrared transmitter light from the infrared receiver. A conical mirror 84 is provided for reflecting light emitted by the infrared transmitters and for reflecting light sent to the infrared receivers in a radial fashion. The red LEDs 79 indicate to a user that the transducer is powered up.

The infrared transmitter 78 and receiver 113 provide for communication between the transducer 16 and a computer located in the vehicle fender. An auxiliary connector 82 is provided as a test port and program download/upload port for the transducer 16. A power switch 83 is provided to turn the system on and off. O-rings 88 protect the environmentally sensitive areas from moisture and dirt.

Figure 8:
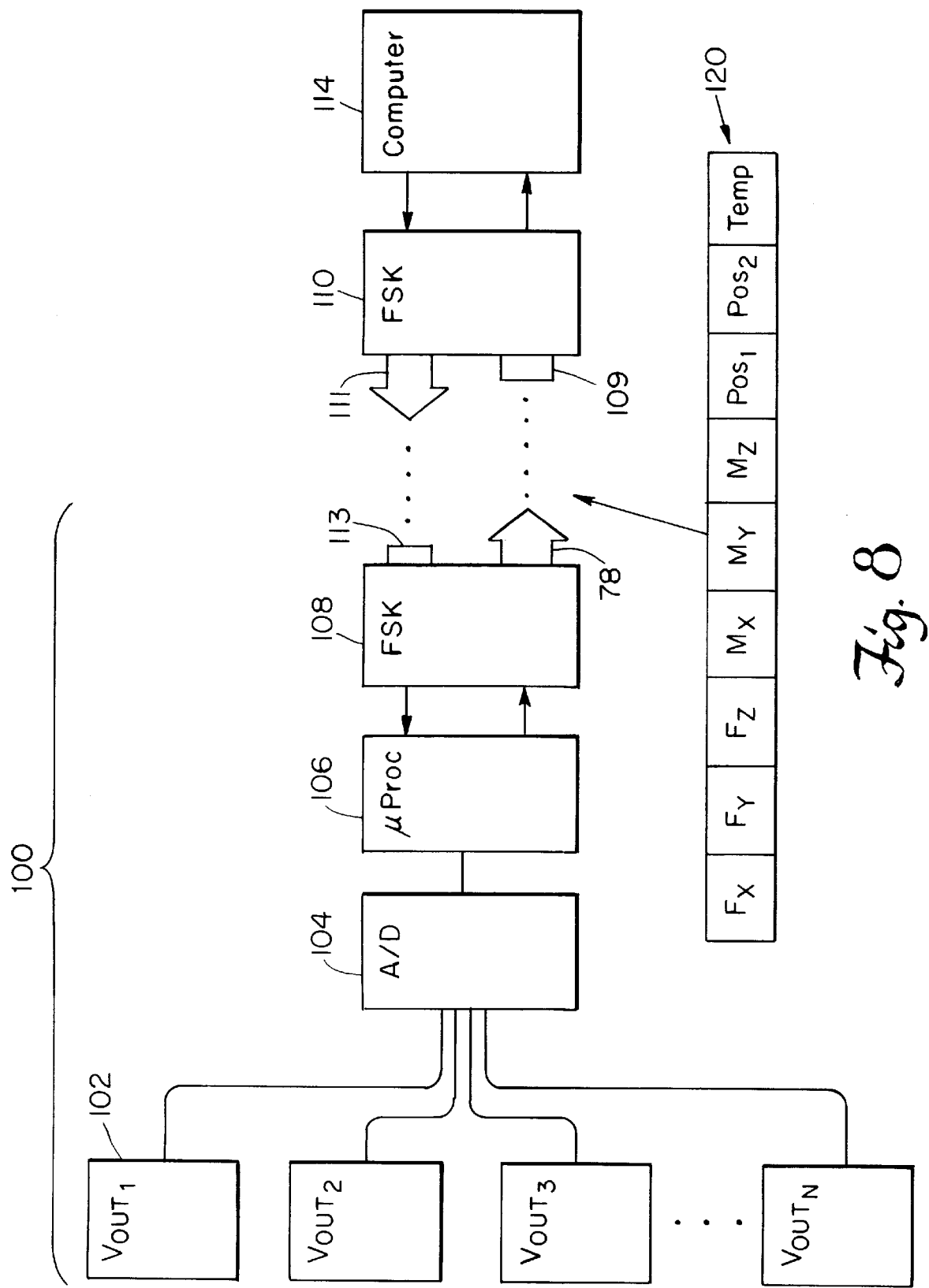
FIG. 8 is a block diagram of the transducer system electronics in accordance with the present invention.

In FIG. 8 the analog outputs from the several Wheatstone Bridges 102 are converted from analog to digital signals by multiplexing A/D converter 104 and are processed by the microprocessor 106. The microprocessor 106 sorts the relevant information to be transmitted to the fender module 110 and transmits the data to frequency shift keying (FSK) circuitry 108.

The optical data link replaces slip rings used in prior art wheel transducers for transmitting data to and from the rotating wheel. Slip rings are known to be failure prone, mechanically complex and expensive. With the optical link, data may be transferred in a more efficient manner than with the slip rings.

The FSK circuit 108 and infrared transmitters 78 provide a wireless optical data link between the wheel transducer 100 and the fender electronics module 110. Data is transmitted over two carrier frequencies, for example, 400 KHz representing a logical 1 and 300 KHz representing a logical 0. FSK data transmission eliminates the effect of ambient light on the data link. Also with FSK data transmission, the amplitude of the data transmitted is irrelevant, ideal for the present situation where the wheel is electrically isolated from the fender. The data is transmitted optically, for example, by infrared light, to an infrared receiver 109 coupled to an FSK decoder circuit 110 where it is decoded and forwarded to the computer 114.

Data is transmitted in packets 120 which may include force data, moment data, wheel position information, and temperature information.

In a similar fashion, data may be downloaded from the computer 114 and FSK decoder circuit 110 to the wheel transducer 100 by using FSK transmission at other frequencies, for example, 50 KHz for a logical 1 and 40 KHz for a logical 0. Data is downloaded from the computer 114 to FSK circuitry 110 where it is transmitted by infrared transmitter 111 to an infrared receiver 113 positioned on the wheel transducer 100. The data is then decoded by FSK circuitry 108 and processed by the wheel transducer microprocessor 106.

Figure 9:
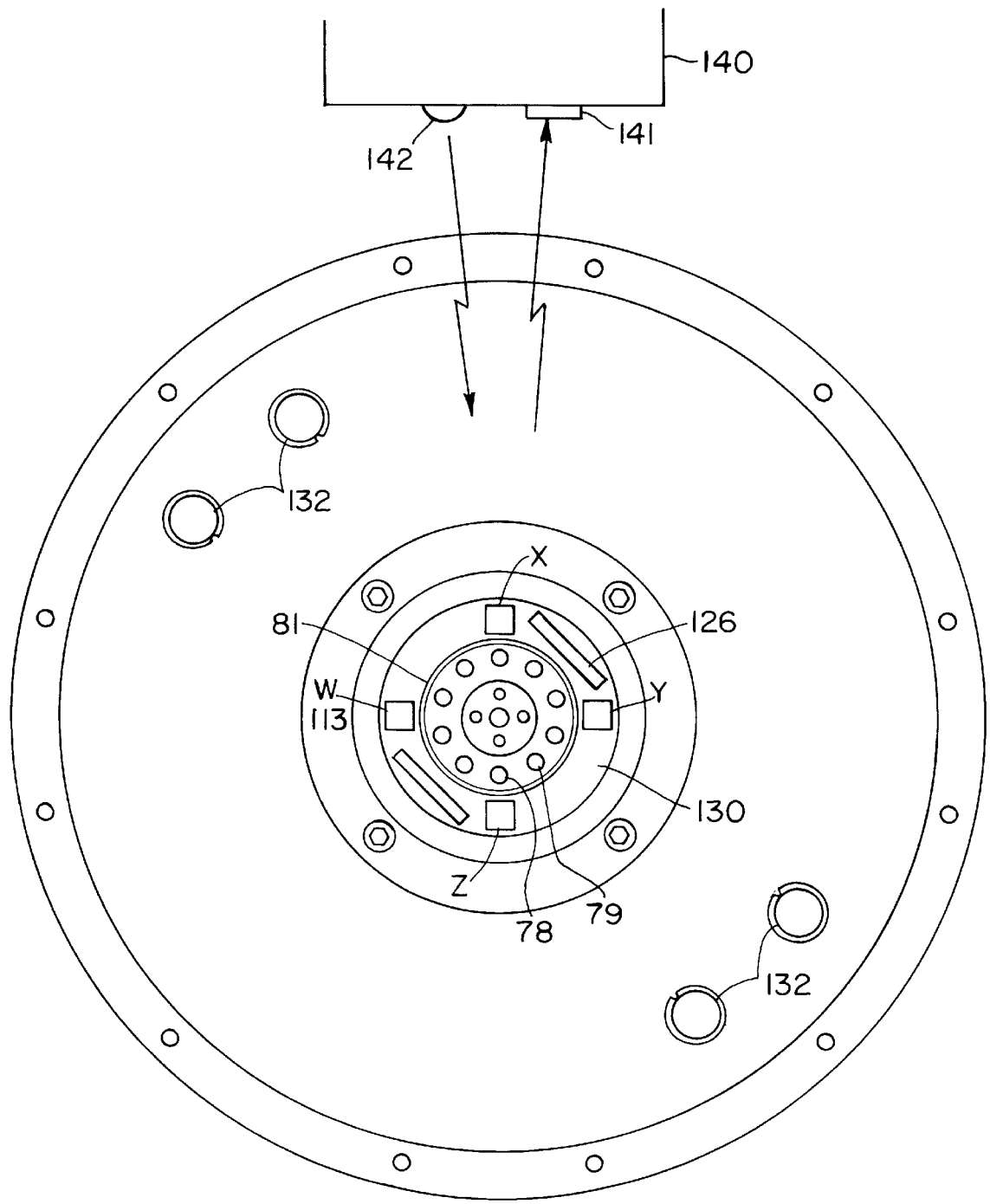
FIG. 9 is a schematic illustration of the positions of the transmitting and receiving infrared diodes mounted on the first embodiment electronics module of the transducer hub, in accordance with the present invention.

FIG. 9 is a front sectional view of the wheel transducer electronics module 51 taken along lines 9—9 of FIG. 4 and showing a preferred positioning of the infrared LED transmitters 78, the infrared receivers 113, the red LEDs 79, the light baffle 81 and the connectors 126 on the communication daughter board 130. Also shown are the spring-loaded battery connectors 132.

In the first embodiment, five infrared LED transmitters 78 are positioned in a circular fashion at the center the electronics module of the wheel transducer hub. All five transmit the same data at the same time. The data is reflected by the conical mirror 84 shown in FIG. 4, radially outward from the center of the hub providing 360 degrees of rotational transmission. In this manner, an infrared receiver 141 mounted in the fender of the vehicle is in continuous communication with the wheel transducer unit. The five red LEDs 79 are provided as a power indicator for the user. Four infrared receivers 113 are provided for communication in a reverse direction from the fender electronics 140 to the wheel.

At any given time, the angular position of the wheel may be determined by the relative strength of a signal, transmitted by the fender unit 140 at transmitter 142, and received by the four infrared receivers 113. A continuous signal 142 at a predetermined frequency is transmitted by the fender unit 140 and received by the infrared receivers 113 at varying intensities, depending on the relative position of the individual receivers. At the position shown in FIG. 9, receiver 113X is receiving a strong signal relative to receiver 113Z. Receivers 113W and 113Y are receiving signals of equivalent intensity. The analog output generated by receivers 113X and 113Z as well as the output generated by receivers 113W and 113Y are fed into separate differential amplifier circuits. The output of each amplifier produces a sinusoidal wave, each output shifted 90 degrees relative to the other. The sinusoidal waves are digitized in A/D converter 104 and fed through the optical data link to the fender module where the angular position of the wheel at any given time is trigonometrically determined in computer 114.

The signals received by the fender module include a sampling of forces and moments acting on the wheel and the relative angular position data of the wheel at any given time. A sample set may comprise 120 bits of digitized data and is sent 300 to 500 times per second, providing sufficient bandwidth for accurate resolution of forces and moments.

Figure 11:
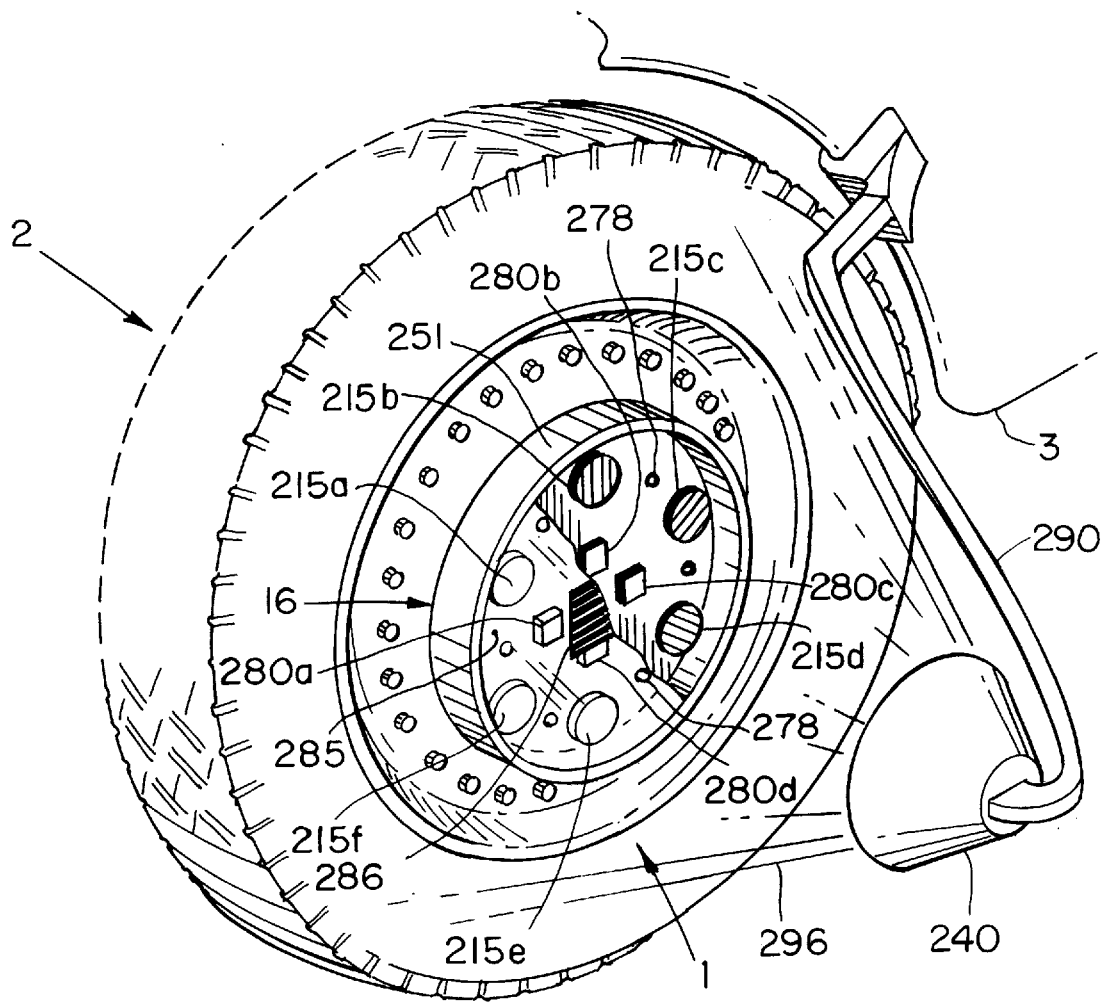
FIG. 11 perspective view of a vehicle wheel and wheel transducer hub including a second embodiment electronics module of the present invention.

FIG. 11 is a perspective view of a second embodiment electronics module 251 constructed according to the principles of the present invention. This second embodiment incorporates a layout for more accurately determining the angular position of the wheel 2 during rotation, as during forward and back movement of the vehicle, in addition to determining vertical translation of the wheel 2 on the vehicle's suspension and determining the steering angle of the wheel 2, as during turning of the vehicle. The second embodiment is most notably different in the layout of the detectors, see 215a–215f and 280a–280d, on the face of the electronics module 251 and the positioning of the fender unit 240 substantially along the axis of rotation of the wheel 2 on arm 290 rigidly connected to a fender 3 of the vehicle.

More specifically, six angular position sensors, see 215a–215f, are positioned at 60° increments around the center of the electronics module 251 on the transducer 16. Additionally, four steering angle/vertical position sensors 280a–280d are placed at 90° increments further towards the center of the electronics module 251. These sensors 280a–280d and 215a–215f are protected from rain and other road hazards by a filter glass window 285 which is shown in FIG. 11 partially cut away. This cover 285 has a blackened portion 286 which partially obscures the steering angle/vertical position sensors 280a–280d. The blackened portion 286 of the cover 285 terminates approximately above a center of the steering angle/vertical position sensors 280a–280d. Further, infrared light communications diodes 278 are positioned between the angular position sensors to uplink data regarding forces, moments, angular position, and wheel position gathered by the microprocessor 106, see FIG. 8, of the transducer 16 to the fender unit 240.

The fender unit 240 generates a cone of vertically polarized light 296 which floods most of the wheel 2 with substantially even illumination. Since the area of coverage is rather large compared to the region covered by the sensors, even as the wheel 2 goes over bumps, causing it to translate up and down on the vehicle's suspension, the sensors remain in the cone of light 296. In one preferred embodiment, this cone of light 296 is generated by inward inclined diodes 297 which are arranged in a circle as shown in FIG. 16. These light emitting diodes 297 generate light with a peak at approximately 940 nm. A polarizing filter 298 then vertically polarizes the cone of light 296 flooding the wheel 2. Also, a data detector 299 is placed at the center of the fender unit 240 to detect modulated light from the communications diodes 278 to complete the data link to the computer 114, see FIG. 8, of the fender unit 240.

Figure 12:
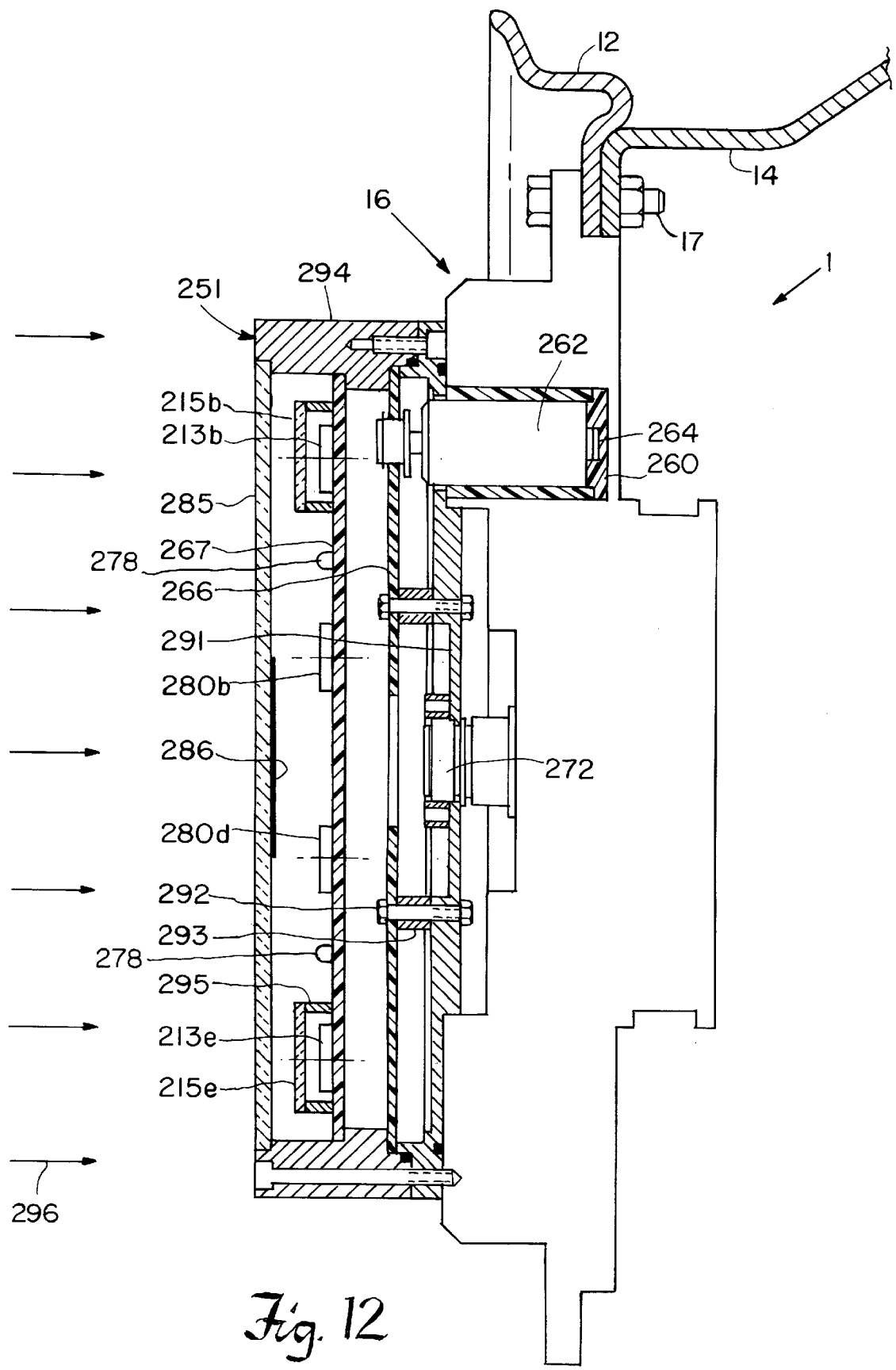
FIG. 12 is a cross-sectional view of the second embodiment electronics module mounted on the wheel transducer hub of the present invention.

In the cross-sectional view of the transducer apparatus 1 shown in FIG. 12, the second embodiment electronics module 251 is mounted on transducer 16. Sensor amplifiers 102, analog-to-digital converter 104, the microprocessor 106, and memory are located on a motherboard 266, which is held separated apart from an electronics module base member 291 by bolts 292 and standoff sleeves 293. A daughter-board 267 is held above the motherboard 266 by side members 294 of the electronics module 251. The daughter-board 267 contains the communication system and specifically carries the angular position sensors 213a–213f, the steering angle/vertical position sensors 280a–280d, and the communications diodes 278.

The angular position sensors 213a–213f are silicon photodiodes, a spectral response of which peaks at approximately 960 nm. As a result, the photodiodes are sensitive to the light cone 296. Each of the angular position sensors 213a–213f is covered by a polarizing light filter 215a–215f which is supported above its corresponding angular position sensor by support members 295. Further filtering is performed by the cover 285 which blocks wavelengths less than 800 nm. Additionally, since the detectors 213a–213f are limited in their responses to wavelengths greater than 1,100 nm, the light to which the sensors respond is dominated by the narrow bandwidth of light generated by the fender unit 240.

Preferably, the light cone 296 from the fender unit 240 is modulated at approximately 40,000 hertz. This allows further isolation of the light cone 296 from ambient light by electrically bandpass filtering the responses of each of the sensors 213a–213f to this frequency. This allows further negation of ambient light effects since any modulation in the ambient light is usually less than 100 Hz and is caused by the rotation of the wheel. Although the high pass filtering of the light to the sensors 213a–213f is not necessary in view of the modulation of the light in the region of 40 KHz, the optical filtering is helpful to avoid sensor saturation by high ambient light levels.

Figure 13:
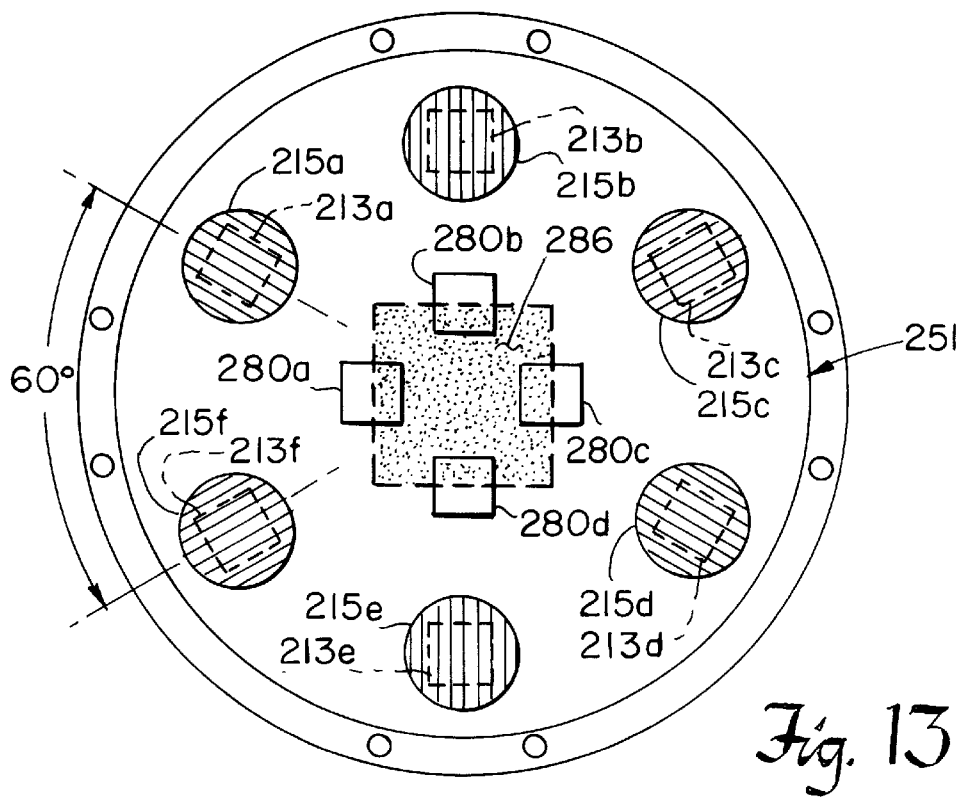
FIG. 13 is a schematic diagram illustrating the sensor layout in the second embodiment electronics module of the present invention.

FIG. 13 is a front plan view of the electronics module 251 showing the arrangement of the angular position sensors 213a–213f and their corresponding polarizing filters 215a–215f along with the steering angle/vertical position sensors 280a–280d and the blackened portion 286. More specifically, round polarizing filters 215a–215f covering the angular position sensors 213a–213f are aligned so that the direction of polarization is radial with respect to the center of the electronics module 251 and thus the wheel 2. Because the light cone 296 generated by the fender unit 240 is vertically polarized, the electrical responses of each one of the sensors 213a–213f is dependent upon the angular position of the wheel 2. Generally, the intensity of light transmitted through a pair of plane polarizers varies as a function of the square of the cosine ($COS^2(\alpha)$) of the angle of rotation between the two polarizers. As a result, when one of the angular position sensors 213 is rotated to a 12 or 6 o'clock position, its response will be at a maximum, whereas when the sensor is positioned at 3 or 9 o'clock, its response will be zero.

Angularly opposed angle position sensors, 213a and 213d for example, are electrically placed in parallel so that their responses are effectively averaged. That is, if the voltage generated by sensor 213e is defined as $V_{213e}$, for example, then $V_1=V_{213a}+V_{213d}$, $V_2=V_{213b}+V_{213e}$, and $V_3=V_{213c}+V_{213f}$. Since the square of the cosine function, $\cos^{2}$, completes two cycles every 360°, each of the voltages $V_1$, $V_2$, and $V_3$ also vary twice per rotation of the wheel 2 as shown in FIG. 15. This ambiguity is removed by using the wheel force data from the load cells A, B, C, D. The angular position of the wheel is determined by the wheel transducer microprocessor 106, see FIG. 8, in the electronic module 251 by comparing the voltages $V_1$, $V_2$, and $V_3$ to the sum of these voltages $V_1+V_2+V_3$. The mathematics are eased by the important fact that the sum of the three voltages, $V_1+V_2+V_3$, is mathematically constant for all angular positions, which allows easy normalization resulting from light intensity variations. Since the square of the cosine changes little at the maxima and minima, better angular resolution is obtained by using each of the voltages $V_1$, $V_2$, $V_3$ during their highest rate of change, i.e., when the sensors are between 1 and 2 o'clock, 4 and 5 o'clock, 7 and 8 o'clock, and 10 and 11 o'clock.

The steering angle/vertical position sensors 280a–280d are utilized to determine steering angle and vertical displacement of the wheel 2 as it is rotated during turning maneuvers and as it moves on the suspension. Steering angle detection is accomplished by differencing the responses of opposed steering angle/vertical position sensors, 280a, 280c for example, when they are horizontal during the rotation of the wheel 2. The horizontal positioning is determined from the angular position information generated by the angular position sensors 213a–213f which is used to transform the data from the steering angle/vertical position sensors 280a–280d.

As stated earlier, the blackened portion 286 of the cover 285 terminates substantially above the centers of each one of the sensors 280a–280d. As the steering angle or vertical position of the wheel 2 changes the shadow cast by the blackened portion 286 changes as shown in FIG. 17. For a turning manoeuver the opposed pair of sensors that is positioned horizontally at a given moment, as for example sensors 280a–280c in FIG. 11, the shadow cast by the blackened portion 286 will be growing over one of the sensors and decreasing over the other one. For example, if the tire shown in FIG. 11 is turned so that the right leading edge is rotated into the page, the shadow cast by the blackened portion 286 would grow over sensor 280c but decrease over sensor 280a. Thus, by electrically differencing the responses of these two sensors, that is, $V_{SA} = V_{280a} - V_{280c}$, a steering angle voltage is generated which is a function of the angle of the wheel 2. Further, a vertical position voltage $V_{VP}$ is yielded by differencing vertically opposed sensors such as $V_{280b} - V_{280d}$ in FIG. 11. Specifically, the contribution of each of the steering angle/vertical position sensors 280a–280d to the steering angle and vertical position over a complete rotation is trigonometrically calculation using the angular position information from angular position sensors. Again, the wheel transducer microprocessor 106 samples these voltages $V_{VP}$, $V_{SA}$ and sends the data to the fender unit 240.

Figure 14:
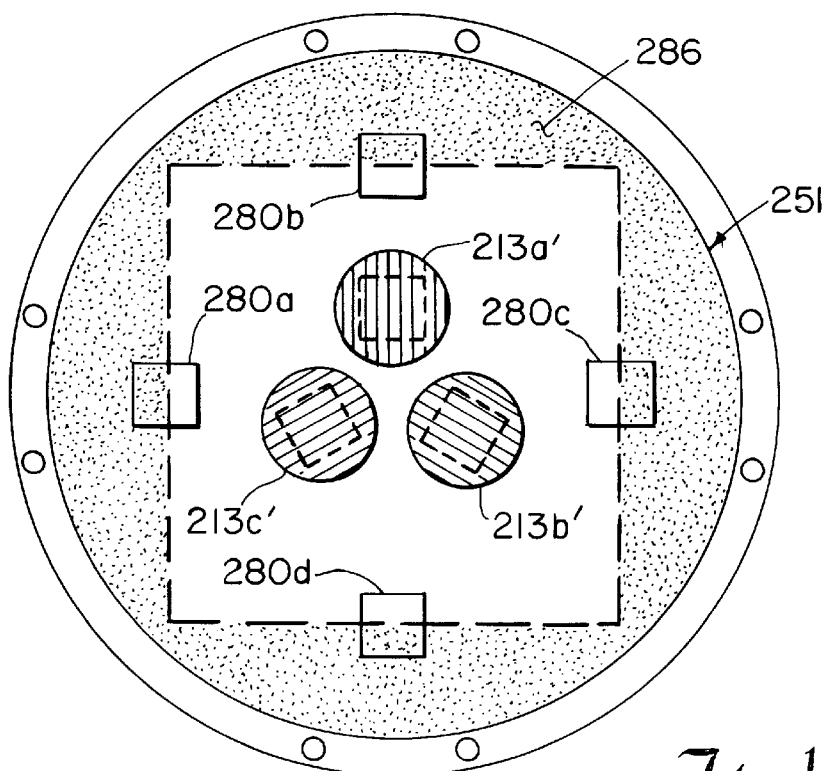
FIG. 14 is an alternate sensor layout in the second embodiment electronics module of the present invention.

FIG. 14 illustrates an alternative sensor layout for the second embodiment electronic module 251. Here, the steering angle/vertical position sensors 280a–280d are placed around the angular position sensors 213a'–213c'. The blackened portion 286 of the cover 285 then obscures the outer halves of each of the steering angle/vertical position sensors 280d—280d. Since this embodiment only uses three angle rotation sensors 213, the counter balancing effects of the electrical parallel connections of the opposed pairs of sensors 213 during turning maneuvers is lost. This detrimental effect is somewhat negated by the fact that the sensors are placed in close proximity to each other.

Other embodiments are also contemplated that fall within the scope of the present invention. For example, the detectors 213a–213f on the electronics module 251 could be replaced with light emitting diodes to generate a polarized light cone emanating from the wheel. Then, sensors with polarizing filters would be placed on the fender unit 240. These polarizing filters in the fender unit 240 are arranged so as to be sensitive to light of various polarization angles. This alternative embodiment, however, is generally thought as not preferred since the power available in the electronics module 251 is limited to its batteries. Since light takes more power to generate than to detect, its preferable to have the detectors on the wheel 2. Another embodiment would be to replace the angular position sensors with a single retroreflector having a polarizing filter. Then, a detector could be placed on the electronics fender unit 140 which will detect the intensity of light reflected by the retroreflector. Here, either the light to the wheel is polarized or the detector has a polarizing filter. The common thread running through each of these various embodiments or implementations is that two polarizing filters are used in which one of the filters is in the frame of reference of the vehicle as a whole, i.e., connected to the vehicle's frame, whereas the other filter is in the frame of reference of the rotating wheel 2, i.e, rotates with the wheel.

While this invention has been particularly shown and described with references to preferred embodiments thereof, it will be understood by those skilled in the art that various changes in form and detail may be made therein without departing from the spirit and scope of the invention as defined by the appended claims.

We claim:

1. A detecting device for a wheel of a vehicle, the device comprising:
   at least one transducer mounted to rotate with the vehicle wheel for sensing a mechanical state of the wheel;
   an optical transmitter mounted to rotate with the vehicle wheel for optically transmitting information concerning the mechanical state of the vehicle wheel sensed by the at least one transducer; and
   a receiver attached to and extending from the vehicle as a cantilever to be positioned in front of and separated from the wheel for receiving the information transmitted by the optical transmitter.

2. A device as claimed in claim 1, further comprising a processor located on the vehicle wheel and responsive to the transducer for controlling the optical transmitter to encode the information concerning the mechanical state of the vehicle wheel.

3. A device as claimed in claim 1, wherein the receiver is substantially rigidly connected to a frame of the vehicle.

4. A device as claimed in claim 1, wherein the at least one transducer comprises load transducers for generating signals indicative of loads acting on the vehicle wheel, the optical transmitter for optically transmitting load information to the receiver.

5. A device as claimed in claim 1, wherein the information is encoded using frequency shift key modulation for the optical transmission.

6. A device as claimed in claim 1, further comprising a nonrotating optical transmitter mounted to the vehicle and a receiver mounted to rotate with the vehicle wheel for transmitting signals from the vehicle to the vehicle wheel.

7. A device as claimed in claim 6, wherein the signals transmitted from the vehicle to the vehicle wheel are used to determined steering angle of the vehicle wheel.

8. A device as claimed in claim 7, further comprising:
   a light obstruction positioned over, but spaced apart from, the rotating receiver; and
   a processor for determining the steering angle in response to the intensity of light detected by the rotating receiver.

9. A device as claimed in claim 8, further comprising an angular position detector for detecting a rotational angle of the wheel, wherein the processor determines the steering angle of the wheel in further response to the detected the rotational angle.

10. A device as claimed in claim 7, wherein the signals transmitted from the vehicle to the vehicle wheel are also used to determine a vertical position of the vehicle wheel.

11. A device as claimed in claim 6, wherein the signals transmitted from the vehicle to the vehicle wheel are used to determine a vertical position of the vehicle wheel.

12. A device as claimed in claim 11, further comprising:
   a light obstruction positioned over, but spaced apart from, the rotating receiver; and
   a processor for determining the vertical position in response to the intensity of light detected by the rotating receiver.

13. A device as claimed in claim 12, further comprising an angular position detector for detecting a rotational angle of the wheel, wherein the processor determines the vertical position of the wheel in further response to the detected the rotational angle.

14. A device as claim in claim 1, wherein the optical transmitter generates the optical transmission in the infrared frequencies.

15. A device as claimed in claim 1, wherein the optical transmitter comprises a plurality of circumferentially positioned transmitting elements for emitting an electromagnetic signal.

16. A device as claimed in claim 1, wherein the at least one transducer comprises load cells, each load cell comprising a cylindrical tubular column having strain gages mounted thereon to measure tensile and compressive strains on the load cell, the strain gages of a plurality of load cells being interconnected to provide an indication of the loads acting on the wheel to the optical transmitter.

17. A detecting device for a wheel of a vehicle, the device comprising:
  at least one transducer mounted to rotate with the vehicle wheel that senses a mechanical state of the wheel;
  an optical transmitter mounted to rotate with the vehicle wheel that optically transmits information concerning the mechanical state of the vehicle wheel sensed by the at least one transducer;
  a receiver attached to the vehicle and separated from the wheel that receives the information transmitted by the rotating optical transmitter;
  a nonrotating optical transmitter mounted to the vehicle that transmits signals from the vehicle to the vehicle wheel; and
  a rotating receiver mounted to rotate with the vehicle wheel that uses the signals from the nonrotating optical transmitter to determine an angular position of the vehicle wheel.

18. A device as claimed in claim 17, further comprising:
  a first polarizer optically interposed between the rotating receiver and the nonrotating optical transmitter having a frame of reference corresponding to the vehicle; and
  a second polarizer optically interposed between the rotating receiver and the nonrotating optical transmitter having a frame of reference corresponding to the wheel.

19. A device as claimed in claim 18, further comprising a processor for determining the angular position of the wheel in response to an intensity of light received by the rotating receiver.

20. A device as claimed in claim 18, wherein the nonrotating optical transmitter is substantially rigidly connected to a frame of the vehicle.

21. A detecting device for a wheel of a vehicle, the vehicle wheel including a hub for mounting to an axle of the vehicle and a rim, the detecting device comprising:
  at least one transducer mounted to rotate with the vehicle wheel for sensing a mechanical state of the wheel, the at least one transducer comprising a plurality of tubular load cells joining the hub to the rim, each load cell including strain gages for providing an indication of loads between the hub and the rim;
  an optical transmitter mounted to rotate with the vehicle wheel for optically transmitting information concerning the mechanical state of the vehicle wheel sensed by the at least one transducer; and
  a receiver attached to the vehicle and separated from the wheel for receiving the information transmitted by the optical transmitter.

22. A device as claimed in claim 21, wherein the tubular load cells are mounted radially between the hub and rim.

23. A device as claimed in claim 21, wherein the hub is closely fit within the rim and the load cells are mounted within cavities such that upon failure of a load cell, the rim and hub remain coupled with the failed load cell in a cavity resisting relative axial movement of the hub and rim.

24. A device as claimed in claim 21, wherein the load cells are preloaded with a compressive load.

25. A device as claimed in claim 24, wherein the compressive load is provided by introducing an interferencial fit between the load cells and the rim.

26. A device as claimed in claim 21, wherein an eccentric bolt sleeve is used to align lug nuts on the hub to bolts on the axle for mounting the hub to the axle for a variety of axle bolt configurations.

27. The wheel load sensor of claim 21, wherein each load cell comprises a cylindrical tubular column having strain gages mounted thereon to measure tensile and compressive strains on the load cell, the strain gages of a plurality of load cells being interconnected to provide an indication of said load.

28. A method for monitoring a mechanical state of a vehicle wheel comprising the steps of:
  detecting the mechanical state of the vehicle wheel with transducers located on the vehicle wheel;
  modulating an optical signal from an optical transmitter located on the vehicle wheel to transmit information regarding the mechanical state of the vehicle wheel;
  providing a receiver that is attached to and extends from the vehicle as a cantilever to be positioned in front of but remote from the wheel; and
  detecting the optical signal with the receiver.

29. A method as claimed in claim 28, wherein the receiver is substantial rigidly attached to the vehicle.

30. A method as claimed in claim 28, further comprising monitoring a response of the transducers with a processor located on the wheel and controlling the optical transmitter to encode an indication of the response in the optical signal.

31. A method as claimed in claim 28, wherein the transducers comprise load transducers for generating signals indicative of loads acting on the wheel, the optical transmitter for optically transmitting load information to the receiver.

32. A method as claimed in claim 28, wherein the information is encoded using frequency shift key modulation for the optical transmission.

33. A method as claim in claim 28, further comprising generating the optical transmission in the infrared frequencies.

34. A method as claimed in claim 28, further comprising:
  providing the vehicle wheel with a hub for mounting to an axle of the vehicle and a rim;
  joining the hub to the rim using a plurality of tubular load cells, each load cell including strain gages for detecting loads between the hub and the rim; and
  modulating the optical signal in response to the loads detected by the strain gages.

35. A method as claimed in claim 34, further comprising:
  forming each load cell from a cylindrical tubular column having strain gages mounted thereon to measure tensile and compressive strains on the load cell; and
  interconnecting the strain gages of a plurality of load cells to provide an indication of the loads acting on the wheel.

36. A method as claimed in claim 28, wherein the optical transmitter comprises a plurality of circumferentially positioned transmitting elements for emitting an electromagnetic signal.

37. A method for monitoring a mechanical state of a vehicle wheel comprising the steps of:
   detecting the mechanical state of the vehicle wheel with transducers located on the vehicle wheel;
   modulating an optical signal from an optical transmitter located on the vehicle wheel to transmit information regarding the mechanical state of the vehicle wheel;
   detecting the optical signal with a receiver remote from the vehicle wheel and separated from the optical transmitter;
   detecting an angular position of the vehicle wheel; and
   modulating the optical signal to transmit the angular position to the receiver.

38. A method as claimed in claim 37, wherein detecting the angular position comprises:
   detecting polarized light generated remotely from the vehicle wheel; and
   determining the angular position of the vehicle wheel by reference to a direction of polarization of the polarized light.

39. A method as claimed in claim 38, wherein determining the angular position comprises detecting a magnitude of the polarized light passing through a polarizing filter located on the vehicle wheel.

40. A method as claimed in claim 38, wherein determining the angular position comprises:
   detecting magnitudes of the polarized light passing through at least three polarizing filters located on the vehicle wheel; and
   combining the magnitudes of the light passing through the polarizing filters to generate a normalizing signal and comparing the normalizing signal to the magnitudes of the light passing through individual polarizing filters.

41. A method for monitoring a mechanical state of a vehicle wheel comprising the steps of:
   detecting the mechanical state of the vehicle wheel with transducers located on the vehicle wheel;
   modulating an optical signal from an optical transmitter located on the vehicle wheel to transmit information regarding the mechanical state of the vehicle wheel;
   detecting the optical signal with a receiver remote from the vehicle wheel and separated from the optical transmitter;
   detecting a steering angle of the vehicle wheel; and
   modulating the optical signal to transmit the steering angle to the receiver.

42. A method as claimed in claim 41, wherein detecting the steering angle comprises detecting a magnitude of light received from a source remote from the vehicle wheel at a detector located on the vehicle wheel having a partial light obstruction.

43. A method for monitoring a mechanical state of a vehicle wheel comprising the steps of:
   detecting the mechanical state of the vehicle wheel with transducers located on the vehicle wheel;
   modulating an optical signal from an optical transmitter located on the vehicle wheel to transmit information regarding the mechanical state of the vehicle wheel;
   detecting the optical signal with a receiver remote from the vehicle wheel and separated from the optical transmitter;
   detecting a vertical position of the vehicle wheel; and
   modulating the optical signal to transmit the vertical position to the receiver.

44. A method for monitoring a mechanical state of a vehicle wheel comprising the steps of:
   detecting the mechanical state of the vehicle wheel with transducers located on the vehicle wheel;
   modulating an optical signal from an optical transmitter located on the vehicle wheel to transmit information regarding the mechanical state of the vehicle wheel;
   detecting the optical signal with a receiver remote from the vehicle wheel and separated from the optical transmitter; and
   transmitting signals from the vehicle to the vehicles wheel with a nonrotating optical transmitter mounted to the vehicle and a rotating receiver mounted to rotate with the wheel.

45. A method for monitoring a mechanical state of a vehicle wheel comprising the steps of:
   providing the vehicle wheel with a hub for mounting to an axle of the vehicle and a rim;
   joining the hub to the rim using a plurality of tubular load cells, each load cell being mounted radially between the hub and rim and including strain gages for detecting loads between the hub and the rim;
   modulating an optical signal from an optical transmitter located on the vehicle wheel to transmit information regarding the loads detected by the strain gages; and
   detecting the optical signal with a receiver remote from the vehicle wheel and separated from the optical transmitter.

46. A method as claimed in claim 45, further comprising closely fitting the hub within the rim and mounting the load cells within cavities such that upon failure of a load cell, the rim and hub remain coupled with the failed load cell in a cavity resisting relative axial movement of the hub and rim.

47. A method for monitoring a mechanical state of a vehicle wheel comprising the steps of:
   providing the vehicle wheel with a hub for mounting to an axle of the vehicle and a rim;
   joining the hub to the rim using a plurality of tubular load cells, each load cell including strain gages for detecting loads between the hub and the rim;
   preloading the load cells with a compressive load;
   modulating an optical signal from an optical transmitter located on the vehicle wheel to transmit information regarding the loads detected by the strain gages; and
   detecting the optical signal with a receiver remote from the vehicle wheel and separated from the optical transmitter.

48. A method as claimed in claim 47, further comprising generating the compressive load by introducing an interferencial fit between the load cells and the rim.

49. A method for monitoring a mechanical state of a vehicle wheel comprising the steps of:
   providing the vehicle wheel with a hub for mounting to an axle of the vehicle and a rim;
   using an eccentric bolt sleeve to align lug nuts on the hub to bolts on the axle to enable mounting of the hub to the axle for a variety of axle bolt configurations;
   joining the hub to the rim using a plurality of tubular load cells, each load cell including strain gages for detecting loads between the hub and the rim;

modulating an optical signal from an optical transmitter located on the vehicle wheel to transmit information regarding the loads detected by the strain gages; and detecting the optical signal with a receiver remote from the vehicle wheel and separated from the optical transmitter.

50. A device as claimed in claim 1, wherein the receiver is positioned axially in front of the wheel.

51. A method as claimed in claim 28, further comprising positioning the receiver axially in front of the wheel.

* * * * *